(12) United States Patent
Matsubara

(10) Patent No.: US 12,524,195 B2
(45) Date of Patent: Jan. 13, 2026

(54) INFORMATION PROCESSING APPARATUS FOR A DISPLAY DEVICE IN A HEAD-MOUNTED DEVICE, INFORMATION PROCESSING METHOD, AND STORAGE MEDIUM

(71) Applicant: CANON KABUSHIKI KAISHA, Tokyo (JP)

(72) Inventor: Mizuki Matsubara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 261 days.

(21) Appl. No.: 18/310,795

(22) Filed: May 2, 2023

(65) Prior Publication Data

US 2023/0367544 A1 Nov. 16, 2023

(30) Foreign Application Priority Data

May 11, 2022 (JP) .................... 2022-078133

(51) Int. Cl.
| | |
|---|---|
| *G06F 3/16* | (2006.01) |
| *G02B 27/01* | (2006.01) |
| *G06T 5/50* | (2006.01) |
| *G06T 19/00* | (2011.01) |
| *G06V 10/74* | (2022.01) |

(52) U.S. Cl.
CPC ......... *G06F 3/165* (2013.01); *G02B 27/0172* (2013.01); *G06T 5/50* (2013.01); *G06T 19/006* (2013.01); *G06V 10/761* (2022.01); *G06T 2207/20221* (2013.01)

(58) Field of Classification Search
CPC .................. G06F 3/165; G06V 10/761; G02B 27/0172; G06T 5/50; G06T 19/006; G06T 2207/20221
See application file for complete search history.

(56) References Cited

U.S. PATENT DOCUMENTS

| | | | |
|---|---|---|---|
| 10,712,998 B2 | 7/2020 | Yasuda | |
| 10,880,668 B1 | 12/2020 | Robinson | |
| 2016/0379660 A1 | 12/2016 | Wright | |
| 2017/0165575 A1* | 6/2017 | Ridihalgh | ............... A63F 13/54 |
| 2017/0287456 A1 | 10/2017 | Zund | |
| 2019/0324708 A1* | 10/2019 | Miyazaki | .................. G06F 3/16 |
| 2019/0387102 A1 | 12/2019 | Norris | |
| 2020/0184968 A1 | 6/2020 | Han | |

FOREIGN PATENT DOCUMENTS

JP 2017069687 A 4/2017

* cited by examiner

*Primary Examiner* — Joseph Saunders, Jr.
(74) *Attorney, Agent, or Firm* — Canon U.S.A., Inc., IP Division

(57) ABSTRACT

An information processing apparatus according to the present disclosure obtains a real image of a real space, a virtual image, external sound in the real space, and virtual sound. The information processing apparatus then adjusts relative sound levels of the virtual sound and the external sound based on at least one of the obtained images.

13 Claims, 9 Drawing Sheets

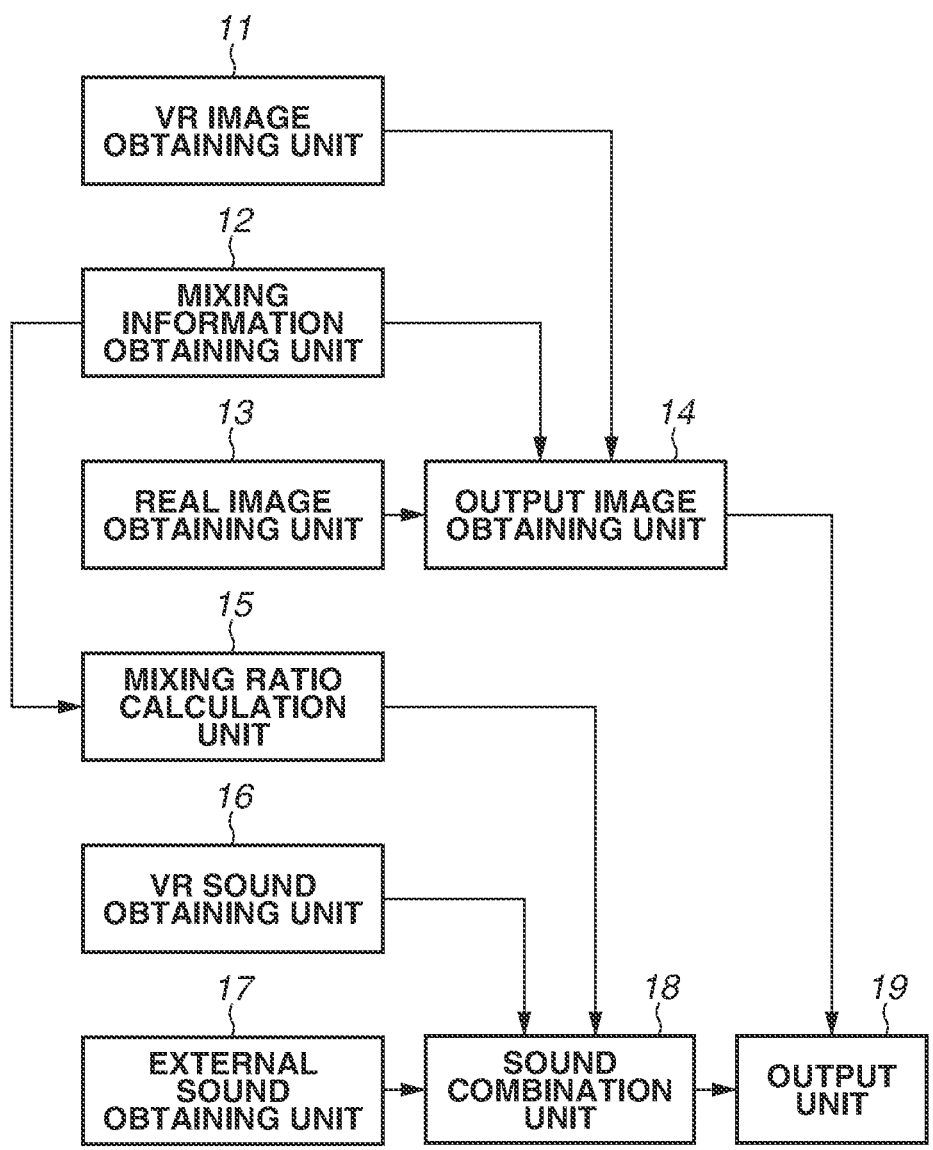

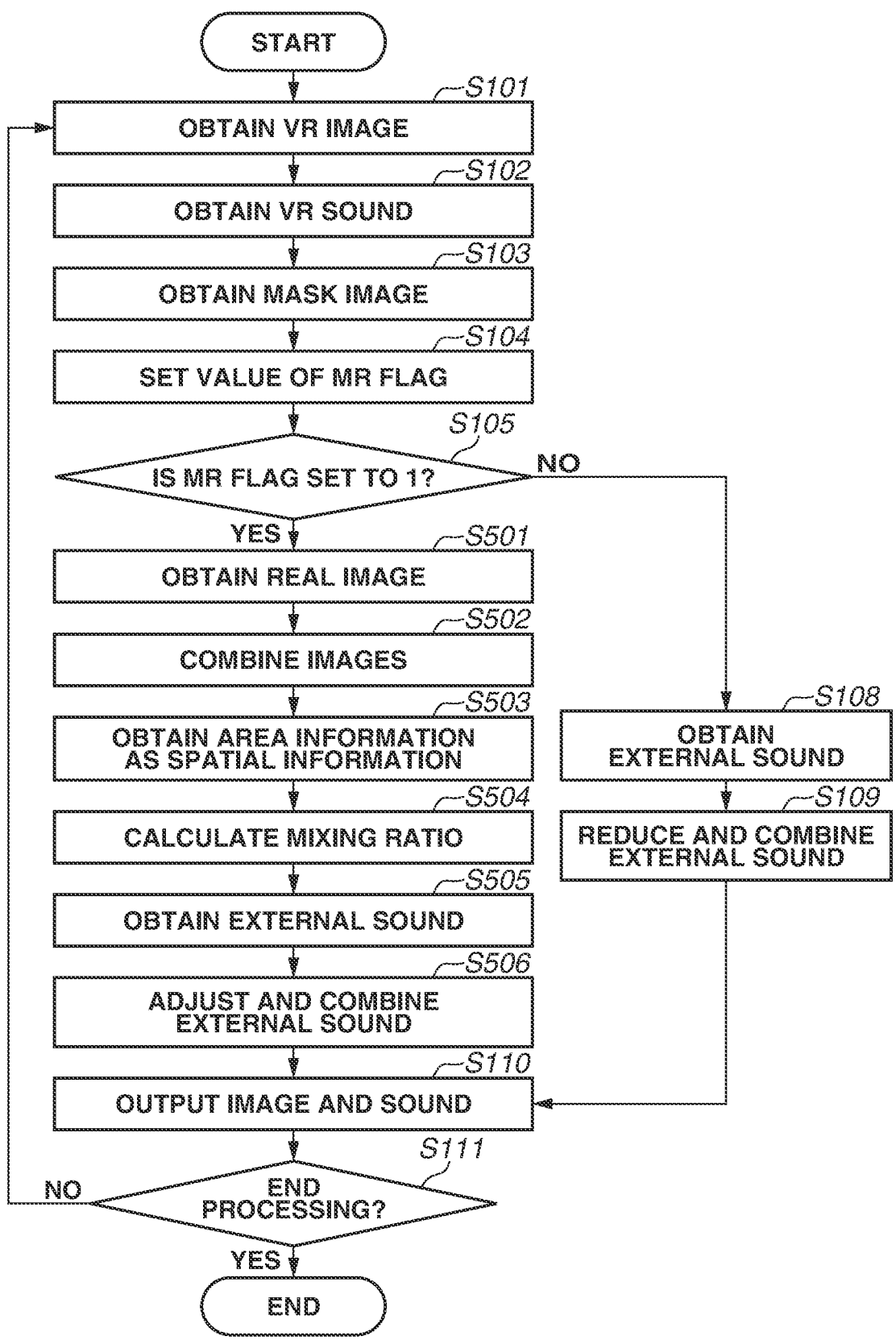

INFORMATION PROCESSING APPARATUS FOR A DISPLAY DEVICE IN A HEAD-MOUNTED DEVICE, INFORMATION PROCESSING METHOD, AND STORAGE MEDIUM

BACKGROUND OF THE INVENTION

Field of the Invention

The present disclosure relates to an information processing technique for processing sound in experiencing virtual reality or mixed reality.

Description of the Related Art

A head-mounted device or head-mounted display (HMD) is one of various types of display apparatuses. A viewer wearing the HMD on the head and watching a video image can enjoy the image full of presence. HMD applications include virtual reality (VR) applications where only images of a VR world are displayed, and mixed reality (MR) applications where images of the real world around the viewer are combined with images of a VR world.

Some sound output devices, such as a headphone device and an earphone device with a noise cancelling function, can adjust the intensity of external sound. Noise cancelling will hereinafter be referred to as "NC", and headphone and earphone devices with an NC function as "NC earphones". NC earphones can substantially cut off the external sound. For example, if NC earphones are used in VR applications, the external sound from the surroundings is cut off, whereby the viewer can easily get a sense of immersion. By contrast, in MR applications, it may be desirable that the sound in the surrounding real space be heard depending on the content displayed on the HMD.

Japanese Patent Application Laid-Open No. 2017-69687 discusses a method of enabling detection of the talking behavior of surrounding people toward a viewer who has limited access to visual and auditory information from the surroundings due to an HMD and NC earphones, and making an adjustment so that the external sound is audible if the talking behavior is detected. With the external sound adjusted to be audible, the viewer can respond easily when spoken to by the surrounding people.

However, according to the technique discussed in Japanese Patent Application Laid-Open No. 2017-69687, the external sound is not audible unless the talking behavior is detected during viewing.

SUMMARY OF THE INVENTION

According to an aspect of the present disclosure, an information processing apparatus includes an image obtaining unit configured to obtain a real image corresponding to a real space and a virtual image, a sound obtaining unit configured to obtain external sound in the real space and virtual sound associated with the virtual image, and an adjustment unit configured to adjust relative sound levels of the external sound and the virtual sound based on at least one of the real image or the virtual image.

Further features of the present disclosure will become apparent from the following description of exemplary embodiments with reference to the attached drawings.

BRIEF DESCRIPTION OF THE DRAWINGS

FIG. 3 is a block diagram illustrating a functional configuration of an information processing apparatus according to a first exemplary embodiment.

FIG. 9 is a flowchart of information processing according to a fifth exemplary embodiment.

DESCRIPTION OF THE EMBODIMENTS

Figure 1:
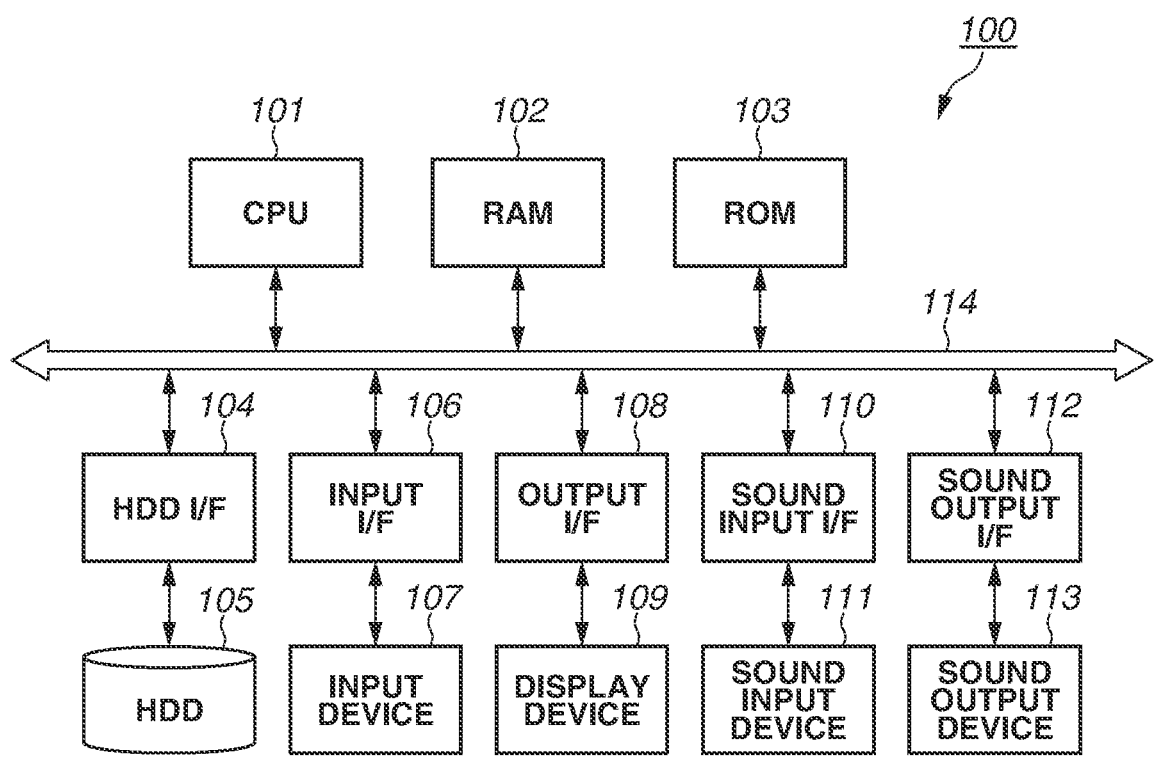
FIG. 1 is a diagram illustrating a hardware configuration example of an information processing apparatus.

Exemplary embodiments of the present disclosure will be described below with reference to the drawings. The following exemplary embodiments are not intended to limit the present disclosure, and all combinations of features described in the exemplary embodiments are not necessarily indispensable to the solving means of the present disclosure. Configurations according to the exemplary embodiments can be changed or modified as appropriate depending on the specifications and various conditions (use conditions and use environment) of apparatuses to which the exemplary embodiments are applied. The exemplary embodiments described below can be combined in part as appropriate. In the following exemplary embodiments, similar components and processing will be described with the same reference numerals.

<Hardware Configuration of Information Processing Apparatus>

A hardware configuration of an information processing apparatus 100 according to a first exemplary embodiment will be described with reference to FIG. 1.

A central processing unit (CPU) 101 executes programs stored in a read-only memory (ROM) 103 or a hard disk drive (HDD) 105, using a random access memory (RAM) 102 as a work memory, and controls operation of each block (described below) via a system bus 114. The programs to be executed by the CPU 101 include an information processing program (described below) according to the present exemplary embodiment. An HDD interface (I/F) 104 connects a secondary storage device such as the HDD 105 or an optical disc drive. The HDD I/F 104 is a Serial Advanced Technology Attachment (SATA) I/F, for example. The CPU 101 can read and write data from and to the HDD 105 via the HDD I/F 104. The CPU 101 can also load the data stored in the HDD 105 into the RAM 102, and conversely store the data loaded in the RAM 102 into the HDD 105.

The CPU 101 can execute programs loaded into the RAM 102.

An input I/F 106 connects an input device 107 such as a keyboard, a mouse, a digital camera, a scanner, or an acceleration sensor. The input I/F 106 can also connect a stereo camera included in a head-mounted device or head-mounted display (HMD) 1 (see FIG. 2A), as the input device 107. For example, the input I/F 106 is a serial bus I/F such as a Universal Serial Bus (USB) I/F or an Institute of Electrical and Electronics Engineers (IEEE) 1394 I/F. The CPU 101 can read data from the input device 107 via the input I/F 106. An output I/F 108 connects the information processing apparatus 100 to a display device 109 serving as the HMD 1. Examples of the output I/F 108 include image output I/Fs such as a Digital Visual Interface (DVI) and a High-Definition Multimedia Interface (HDMI®). The CPU 101 can display images of a virtual reality world and images of a mixed reality world on the HMD 1 by transmitting image data of the virtual reality world and image data of the mixed reality world, which will be described below, to the HMD 1 via the output I/F 108.

A sound input I/F 110 connects a sound input device 111 capable of collecting sound, such as a microphone or a directional microphone. For example, the sound input I/F 110 is a serial bus I/F such as a USB I/F or an IEEE 1394 I/F. A sound output I/F 112 connects a sound output device 113 for outputting sound, such as a headphone device or a speaker. The sound output I/F 112 and the sound output device 113 can be connected not only by wire but also wirelessly. The sound output device 113 can be provided separately from the information processing apparatus 100. The information processing apparatus 100 can control the sound output device 113, or transmit a control signal to control the sound output device 113. The CPU 101 of the information processing apparatus 100 can thereby control the HMD 1 and the sound output device 113 (e.g., a headphone device 2 in FIG. 2A) in an integrated manner. The CPU 101 transmits sound data of the virtual reality world or combined sound data obtained by combining the virtual sound data of the virtual reality world with external sound data of the real world around a viewer to the headphone device 2 via the sound output I/F 112, and outputs the sound from the headphone device 2.

The information processing apparatus 100 may not necessarily include the HDD 105 and the display device 109.

The information processing apparatus 100 may or may not include the HMD 1.

If the information processing apparatus 100 does not include the HMD 1, the information processing apparatus 100 connects to an external HMD via the input I/F 106, and thereby receives data from the external HMD and transmits data to the external HMD. The information processing apparatus 100 can include components other than the foregoing components. An illustration and description thereof will be omitted here.

Before detailed operations and processing of the information processing apparatus 100 are described, a case will be described as an example with reference to FIGS. 2A and 2B, where an image of a mixed reality (MR) world obtained by combining an image of the surrounding real space with an image of a virtual reality world is provided to the viewer.

Figure 2A:
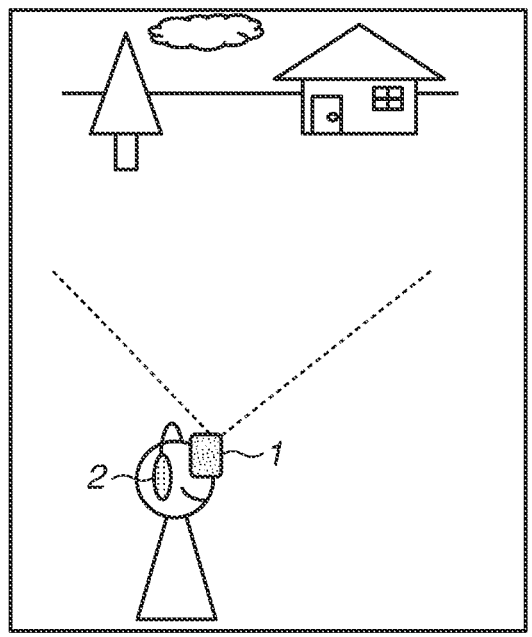
FIGS. 2A and 2B are diagrams illustrating an example of use of a head-mounted display (HMD) in a mixed reality (MR) application.

Suppose, as illustrated in FIG. 2A, that the viewer wears the HMD 1, which is a head-mounted device, and the headphone device 2. The HMD 1 includes a not-illustrated camera (an imaging device). The camera obtains real image data by capturing an image of the real space around the viewer. The HMD 1 also includes a microphone. The microphone can obtain external sound data which is sound in the real space around the viewer. The microphone may not necessarily be included in the HMD 1. In such a case, the microphone is connected to the HMD 1 or the information processing apparatus 100 by wire or wirelessly.

Figure 2B:
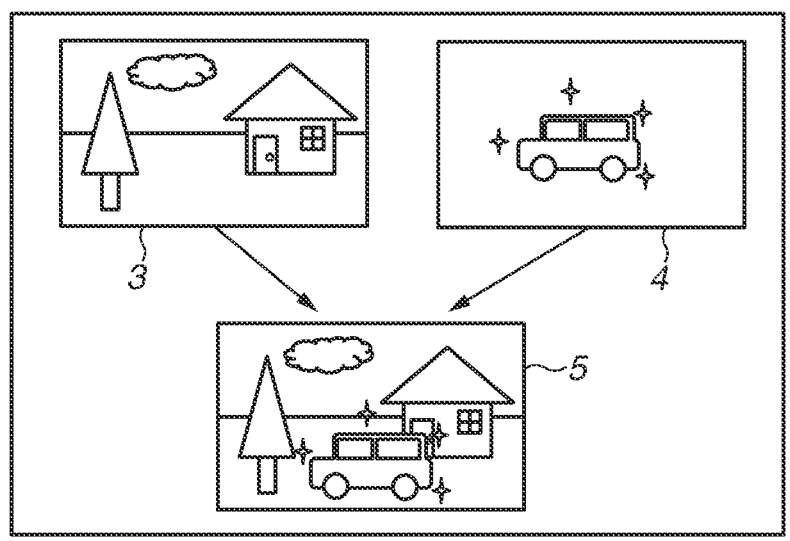

In FIG. 2B, a real image 3 represents an image of the real space captured by the camera of the HMD 1. The HMD 1 also obtains a virtual image 4. The virtual image 4 is a virtual reality (VR) image and will hereinafter be referred to as the VR image 4. The HMD 1 displays an MR image 5 obtained by combining the real image 3 and the VR image 4 on a built-in display, as a display image. The viewer wearing the HMD 1 can thus view the MR image 5 obtained by combining the real image 3 and the VR image 4, i.e., can experience MR. While FIGS. 2A and 2B illustrate an example of an MR application where the MR image 5 is displayed on the HMD 1, the VR image 4 of the VR world alone is displayed as a display image on the HMD 1 if the HMD 1 is used for a VR application.

The headphone device 2 serves as the sound output device 113 that the viewer wears on the ears. The sound output device 113 can be an earphone device. If the HMD 1 is used for the purpose of displaying the image of the VR world (the VR image 4) alone, the headphone device 2 outputs sound in the VR world (hereinafter referred to as VR sound) as virtual sound data. This facilitates the viewer to immerse into the VR world. In particular, in applications where the VR image 4 alone is displayed, information processing for cutting off external sound using a noise cancelling (NC) function, for example, enables the viewer to get a sense of immersion in the VR world easily. By contrast, if the HMD 1 is used for the purpose of combining the image of the real world around the viewer (the real image 3) with the image of the VR world (the VR image 4), it is often desirable that the external sound in the surrounding real space be audible depending on the content of the display image displayed on the HMD 1.

The information processing apparatus 100 according to the present exemplary embodiment, which facilitates the viewer to get a sense of immersion in the VR world in applications where a VR image alone is displayed, and makes the external sound in the surrounding real space audible depending on the display of the HMD 1 in applications where both a VR image and a real image are displayed, will now be described.

<Functional Configuration of Information Processing Apparatus>

FIG. 3 is a functional block diagram illustrating a functional configuration of the information processing apparatus 100 according to the present exemplary embodiment. As illustrated in FIG. 3, the information processing apparatus 100 includes a VR image obtaining unit 11, a mixing information obtaining unit 12, a real image obtaining unit 13, an output image obtaining unit 14, a mixing ratio calculation unit 15, a VR sound obtaining unit 16, an external sound obtaining unit 17, a sound combination unit 18, and an output unit 19. These functional units are implemented by the CPU 101 executing the information processing program according to the present exemplary embodiment. Alternatively, some or all of the functional units can be implemented by a circuit or other hardware component. In the following description, image data handled by the information processing apparatus 100 will be referred to simply as an "image", and sound data handled by the information processing apparatus 100 will be referred to simply as "sound" ("external sound" in the case of external sound data), unless an explicit description is desirable.

The VR image obtaining unit 11 obtains a VR image that is VR image data generated by rendering, or a VR image prepared in advance. Since the VR image obtaining unit 11 is a functional unit implemented by the CPU 101 executing the information processing program according to the present exemplary embodiment, the rendering of the VR image is performed by the CPU 101. Alternatively, a not-illustrated graphics processing unit (GPU) can render the VR image, for example. The VR image obtaining unit 11 outputs the obtained VR image to the output image obtaining unit 14. Details of the operation of the VR image obtaining unit 11 will be described below.

The real image obtaining unit 13 obtains, as a real image, an image of the real space captured by the camera (the imaging device). The real image obtaining unit 13 then outputs the real image to the output image obtaining unit 14. In the present exemplary embodiment, the camera is included in the input device 107.

The mixing information obtaining unit 12 outputs mixing information to the output image obtaining unit 14 and the mixing ratio calculation unit 15. In the present exemplary embodiment, mask image data (referred to as a mask image) is used as the mixing information. The mask image is used to specify the range of the VR image to be superimposed on the real image obtained by capturing the real space using the camera. Details of the mixing information and the mask image according to the present exemplary embodiment will be described below.

The mixing ratio calculation unit 15 calculates the mixing ratio of the real image and the VR image based on the mixing information obtained by the mixing information obtaining unit 12. The mixing ratio calculation unit 15 outputs information about the calculated mixing ratio to the sound combination unit 18. Examples and other details of the mixing ratio will be described below.

The output image obtaining unit 14 combines the VR image and the real image based on the mixing information obtained by the mixing information obtaining unit 12, and obtains the combined image data (referred to as the combined image) as an output image. Since the output image obtaining unit 14 is a functional unit implemented by the CPU 101 executing the information processing program, the generation of the combined image is performed by the CPU 101. Alternatively, a not-illustrated GPU can generate the combined image, for example. The output image obtaining unit 14 outputs the output image to the output unit 19.

The VR sound obtaining unit 16 generates VR sound that is VR sound data, or obtains VR sound prepared in advance in association with the VR image. Since the VR sound obtaining unit 16 is a functional unit implemented by the CPU 101 executing the information processing program, the generation of the VR sound is performed by the CPU 101. Alternatively, a not-illustrated GPU can generate the VR sound, for example. The VR sound obtaining unit 16 outputs the VR sound to the sound combination unit 18. Details of the operation of the VR sound obtaining unit 16 will be described below.

The external sound obtaining unit 17 obtains external sound in the surrounding real space using the sound input device 111 such as a microphone. The external sound obtaining unit 17 outputs the obtained external sound to the sound combination unit 18.

The sound combination unit 18 adjusts the relative sound levels of the external sound and the VR sound based on the information about the mixing ratio, and outputs the adjusted sound to the output unit 19 at the subsequent stage. As described in detail below, the sound combination unit 18 performs processing for making an adjustment so that the viewer can hear the external sound or processing for making an adjustment to reduce the external sound, based on the information about the mixing ratio. The sound adjustment processing based on the mixing ratio includes generating combined sound by simply combining the external sound with the VR sound, generating combined sound by making an adjustment to reduce the external sound and combining the reduced external sound with the VR sound, and adjusting (reducing) the sound level of the VR sound so that the external sound in the real space is audible. In other words, the sound combination unit 18 adjusts the relative sound levels of the external sound and the VR sound (hereinafter referred to as "make a sound adjustment") based on the information about the mixing ratio, and outputs the adjusted sound to the output unit 19 at the subsequent stage. The adjustment to reduce the external sound includes an adjustment to substantially cut off the external sound by noise cancelling. If, for example, the adjustment to reduce the sound level of the VR sound is made based on the mixing ratio, the user can easily hear the external sound since the sound level of the external sound increases relative to that of the VR sound.

The output unit 19 outputs the output image from the output image obtaining unit 14 to the display device 109 (the HMD 1 in the present exemplary embodiment). The output unit 19 also outputs the combined sound from the sound combination unit 18 to the sound output device 113 (the headphone device 2 in the present exemplary embodiment).

The foregoing pieces of data including the VR image, the mask image (the mixing information), the mixing ratio, the output image, and the VR sound can be obtained and stored in the HDD 105 in advance, and the information processing apparatus 100 can read the data from the HDD 105 as appropriate. Alternatively, the information processing apparatus 100 can obtain the pieces of data including the VR image, the mask image, the output image, the mixing ratio, and the VR sound from the cloud (not illustrated) via a communication apparatus (not illustrated) as appropriate.

In the present exemplary embodiment, the VR image, the mask image, the real image, and the output image have the same resolution. However, these images may not necessarily have the same resolution. For example, the images can be stored in different resolutions, and the information processing apparatus 100 can match the resolutions by scaling processing during calculation. Moreover, while the VR sound and the external sound are sound data of the same sampling rate in the present exemplary embodiment, different sampling rates can be used. The two pieces of sound data can be adjusted to have the same sampling rate by interpolation or resampling processing before combination.

While the VR image, the real image, and the output image are image data of three primary color channels, i.e., red, green, and blue (RGB) in the present exemplary embodiment, the number of channels may not necessarily be three. For example, the images can be single-channel monochrome image data, or five-channel image data including color difference channels.

While the external sound, the VR sound, and the combined sound are single-channel monaural data in the present exemplary embodiment, the number of channels may not necessarily be one. Two-channel stereo data or five-channel stereophonic data can be used.

<Information Processing>

Figure 4:
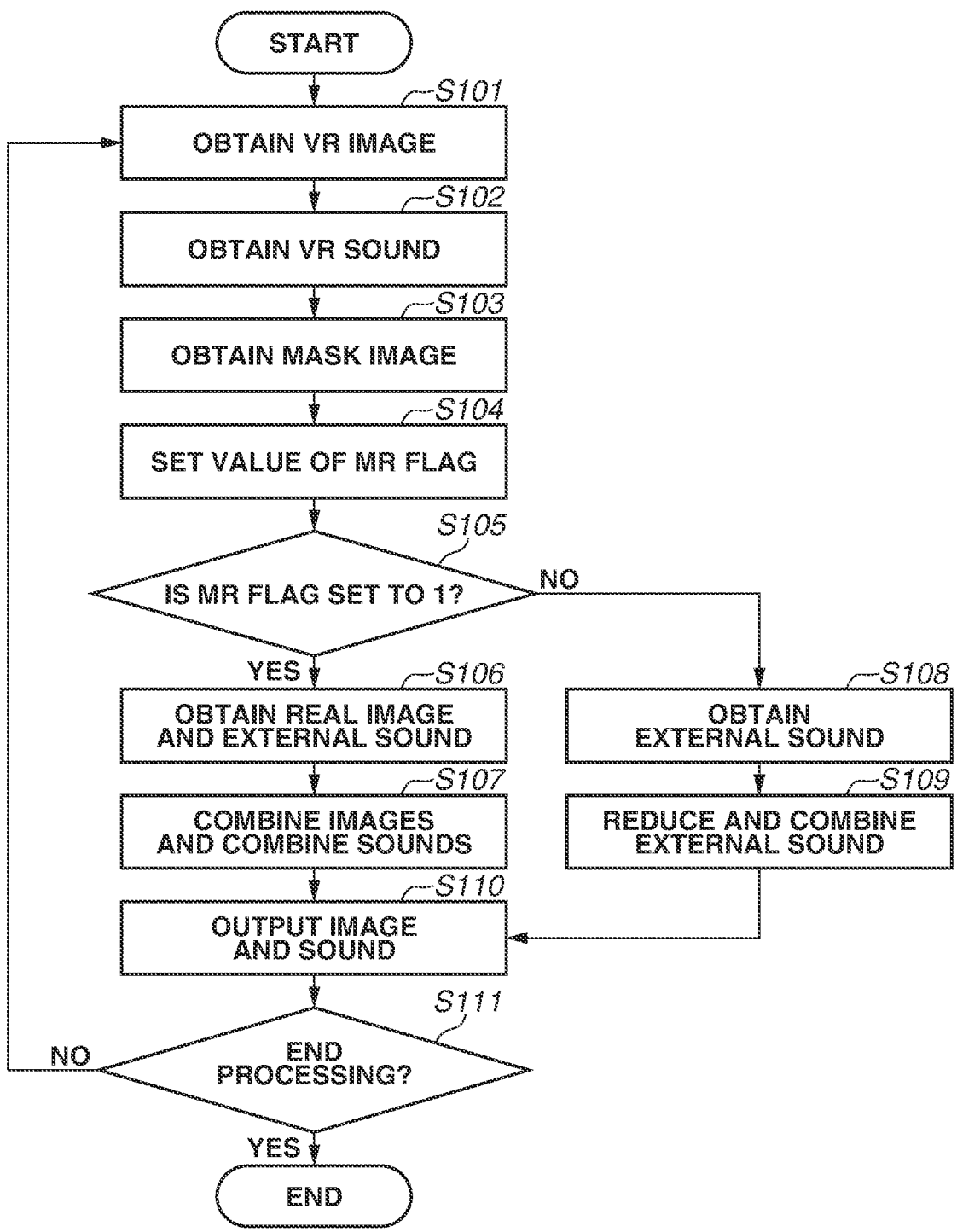
FIG. 4 is a flowchart of information processing according to the first exemplary embodiment.

FIG. 4 is a flowchart illustrating a procedure for information processing performed by the information processing apparatus 100 according to the present exemplary embodiment.

In step S101, the VR image obtaining unit 11 obtains a VR image. As described above, the VR image refers to VR image data, or an image showing a world different from the real world around the viewer. Examples of the VR image include an image generated by rendering three-dimensional model data from a virtual viewpoint using a conventional rendering technique, and an image generated by capturing an image of the real world at a time or place different from that in the real world around the viewer using a camera.

In step S102, the VR sound obtaining unit 16 obtains VR sound. As described above, the VR sound refers to sound data in a VR world. The VR sound is generated as sound that can be heard at a virtual listening point (a virtual viewpoint in the present exemplary embodiment) based on a positional relationship including a distance and a direction between the position of a virtual sound source and the listening point (the virtual viewpoint) set in three-dimensional model data. If an image captured in a situation different from the real world around the viewer is used as the VR image, the VR sound is, for example, sound obtained by collecting the surrounding external sound in this situation using a microphone. As another example, sound such as background music (BGM) can simply be used as the VR sound.

In step S103, the mixing information obtaining unit 12 obtains a mask image as the mixing information. The mask image is an image where the pixel values at the positions of pixels to be superimposed as a VR image on the real image are 1, and the pixel values at the other pixel positions are 0. In other words, image areas of the mask image where the pixel values are 1 are areas corresponding to the VR image, and image areas where the pixel values are 0 are areas corresponding to the image other than the VR image.

In step S104, the mixing ratio calculation unit 15 calculates a mixing ratio based on the mixing information obtained by the mixing information obtaining unit 12 in step S103. The mixing ratio calculation unit 15 then sets the value of a predetermined flag based on the mixing ratio. For example, if the mixing ratio has a value corresponding to a real image, i.e., there is an image area corresponding to a real image in the mask image, the mixing ratio calculation unit 15 sets the predetermined flag indicating whether to combine a real image to 1. If the mixing ratio does not have a value corresponding to a real image, i.e., there is no image area corresponding to a real image in the mask image, the mixing ratio calculation unit 15 sets the predetermined flag to 0. In other words, the mixing ratio calculation unit 15 sets the predetermined flag to 1 if the mask image includes an image area other than the VR image. The mixing ratio calculation unit 15 sets the predetermined flag to 0 if the entire area of the mask image corresponds to the VR image. In the following description, the predetermined flag will be referred to as the MR flag.

In step S105, the information processing apparatus 100 determines whether the MR flag is set to 1 or 0. If the MR flag is set to 1 (YES in step S105), the processing proceeds to step S106. If the MR flag is set to 0 (NO in step S105), the processing proceeds to step S108.

In step S108, the external sound obtaining unit 17 obtains external sound in the surrounding real space from the sound input device 111 such as a microphone.

In step S109, the sound combination unit 18 combines the external sound obtained by the external sound obtaining unit 17 with the VR sound obtained by the VR sound obtaining unit 16. At this time, the sound combination unit 18 performs sound adjustment processing for reducing the external sound. In the present exemplary embodiment, a conventional noise cancelling technique is used as a technique for reducing the external sound. More specifically, in the external sound combination processing in step S109, the sound combination unit 18 performs sound adjustment processing for substantially cutting off the external sound obtained in step S108 by adding sound of opposite phase to the external sound, and combines the resulting sound with the VR sound. In this manner, the external sound and the sound of opposite phase cancel out each other, and the external sound is substantially cut off. The sound combination unit 18 then outputs, to the output unit 19, the sound after the sound adjustment processing, i.e., the combined sound including substantially only the VR sound with the external sound cut off.

After the processing of step S109, the processing proceeds to step S110. In step S110, the output unit 19 outputs the output image to the display device 109, i.e., the HMD 1, and outputs the combined sound to the sound output device 113, i.e., the headphone device 2.

More specifically, if the processing proceeds to step S110 after the MR flag is determined to be 0 in step S105 and the processing of steps S108 and S109 is performed, the output image including only the VR image is displayed on the HMD 1, and the combined sound including only the VR sound with the external sound cut off is output from the headphone device 2. The combined sound can include sound other than the VR sound as long as the VR sound is louder than the other sound.

In step S106, the real image obtaining unit 13 obtains, as a real image, an image of the real space captured by the camera. The external sound obtaining unit 17 obtains the external sound in the real space that is collected by the sound input device 111 such as a microphone.

In step S107, the output image obtaining unit 14 generates a combined image as an output image by combining the real image obtained by the real image obtaining unit 13 with the VR image obtained by the VR image obtaining unit 11. In other words, the output image generated at this time is an MR image into which the real image and the VR image are combined. In combining the real image with the VR image, the output image obtaining unit 14 obtains the mask image from the mixing information obtaining unit 12, and multiplies the VR image by the mask image pixel position by pixel position. The output image obtaining unit 14 further adds the multiplication result to the real image pixel position by pixel position.

As a result, the VR image within the range specified to be superimposed by the mask image is superimposed on the real image. At this time, to smooth transitions at the seams between the real image and the VR image, the output image obtaining unit 14 can perform conventional blending processing.

In step S107, the sound combination unit 18 generates combined sound as output sound by combining the external sound obtained by the external sound obtaining unit 17 with the VR sound obtained by the VR sound obtaining unit 16. In other words, the output sound generated at this time is sound (MR sound) obtained by simply combining the collected external sound with the VR sound. In such a manner, if the MR flag is determined to be 1 in step S105, the MR sound into which the external sound and the VR sound are simply combined is output without the sound adjustment processing for reducing the external sound in step S109. Alternatively, in step S107, the sound combination unit 18 can make a sound adjustment to amplify the collected external sound, for example, and combine the amplified external sound with the VR sound. In other words, the sound combination is not limited in particular as long as both the external sound and the VR sound are audible.

After the processing of step S107, the processing proceeds to step S110. In step S110, the output unit 19 outputs the output image (the MR image) obtained by combining the VR image and the real image to the display device 109 as the HMD 1. If the processing proceeds from step S107 to step S110, the output unit 19 outputs the output sound (the MR sound) obtained by combining the VR sound and the external sound to the headphone device 2 worn by the user. More specifically, if the processing proceeds to step S110 after the MR flag is determined to be 1 in step S105 and the processing of steps S106 and S107 is performed, the combined sound including not only the VR sound but also the external sound is output from the headphone device 2. This enables the viewer to hear the external sound in the surrounding real space while listening to the VR sound output from the headphone device 2.

In step S111, the information processing apparatus 100 determines whether to end the processing of this flowchart. If the information processing apparatus 100 determines to not end the processing (NO in step S111), the processing returns to step S101. For example, if the viewer is watching a moving image, processing corresponding to the next frame is performed in step S101. If the information processing apparatus 100 determines to end the processing because, for example, an end instruction is given by the viewer (YES in step S111), the processing of the flowchart ends.

As described above, the information processing apparatus 100 according to the present exemplary embodiment substantially cuts off the external sound if the VR image alone is displayed on the HMD 1. This enables the viewer to immerse in the VR world easily. If a combined image of the VR image and the real image is displayed on the HMD 1, the information processing apparatus 100 performs control so that the external sound is not reduced, whereby the viewer can hear the external sound around the viewer. In addition, the information processing apparatus 100 according to the present exemplary embodiment automatically switches whether to cut off the external sound between when the VR image alone is displayed on the HMD 1 and when the combined image of the VR image and the real image is displayed on the HMD 1. Therefore, the present exemplary embodiment eliminates the need for the viewer to perform an operation to switch whether to cut off the external sound. As a result, the viewer can save time.

The example has been described above with reference to FIG. 4, where both the VR sound and the external sound are audible to the viewer if the combined image of the VR image and the real image is displayed, whereas the external sound is substantially cut off by noise cancelling and the viewer can substantially hear only the VR sound if the VR image alone is displayed. However, the present exemplary embodiment is not limited thereto. Suppose, for example, that the viewer uses an earphone device with which the viewer can hear the external sound while the noise cancelling function is off. In such a case, the external sound obtaining processing of step S106 and the external sound combination processing of step S107 in FIG. 4 can be eliminated. Also in this case, the viewer can hear the external sound in the surrounding real space while listening to the VR sound output from the earphone device if the combined image of the VR image and the real image is displayed.

In the present exemplary embodiment, the example has been described above where the mixing information obtaining unit 12 obtains the mask image as the mixing information in step S103. However, the present exemplary embodiment is not limited thereto. For example, information other than the mask image can be used as long as the information enables determination of whether the HMD 1 is used for a VR application where the VR image alone is displayed or an MR application where the combined image of the VR image and the real image are displayed. For example, if viewing application programs to be run on the HMD 1 are provided separately for VR and MR and the use purposes thereof are identifiable, the mixing information obtaining unit 12 can obtain information indicating the use purpose of a running application program, as the mixing information. In such a case, the mixing information obtaining unit 12 can obtain information indicating the type of the application program, as the mixing information. In step S104, if the application program is for a VR application, the mixing ratio calculation unit 15 sets the MR flag to 0. If the application program is for an MR application, the mixing ratio calculation unit 15 sets the MR flag to 1.

In the present exemplary embodiment, the example has been described above where the external sound is substantially cut off by noise cancelling that adds the sound of opposite phase to the external sound. However, the external sound can be cut off by techniques other than noise cancelling. For example, the viewer's ears can be covered with a material hard to transmit the external sound, and if the MR flag is determined to be 1, the external sound can be collected with a microphone in step S106 and combined with the VR sound in step S107. In such a case, the processing of steps S108 and 109 in the flowchart of FIG. 4 can be eliminated.

In the present exemplary embodiment, the example has been described above where the external sound is reduced if the VR image alone is displayed. However, the external sound may not necessarily be reduced in such a situation, and a sound adjustment can be made so that the external sound is audible to the viewer. This considers a case where the viewer wishes to find out his/her surroundings when moving. In such a case, for example, in step S103, the mixing information obtaining unit 12 obtains mixing information including the value of an acceleration sensor included in the HMD 1. In step S104, the mixing ratio calculation unit 15 calculates the mixing ratio by taking into consideration the value of the acceleration sensor as well. As a result, for example, in step S109, the sound combination unit 18 can combine the external sound with the VR sound based on the value of the acceleration sensor. More specifically, if, for example, the sound combination unit 18 determines that the viewer is moving based on the value of the acceleration sensor, the sound combination unit 18 generates the combined sound without making the adjustment to reduce the external sound. This enables the viewer who is moving to find out his/her surroundings from the external sound.

Whether the viewer is moving can be determined, for example, using a classifier trained in advance to determine whether the viewer is moving from the value of the acceleration sensor by conventional machine learning processing. In such a case, the mixing ratio calculation unit 15 calculates the mixing ratio so as to include a flag about whether the viewer is moving, using the classifier. If the viewer is determined to be moving based on the flag included in the mixing ratio, the sound combination unit 18 does not combine the sound of opposite phase to that of the external sound with the VR sound. If the viewer is determined to be not moving based on the flag included in the combining ratio, the sound combination unit 18 reduces the external sound by combining the sound of opposite phase to that of the external sound with the VR sound. The use of the value of the acceleration sensor as the technique for determining whether the viewer is moving is not essential, and other techniques that can detect the movement of the viewer can be used. For example, the viewer's viewing area in the real world can be set in advance, and whether the viewer leaves the area can be sensed by a conventional sensing technique. If the viewer goes out of the area set in the real world, the sound combination unit 18 performs control so that the external sound is not reduced, or conversely the external sound is reduced.

While the information processing apparatus 100 according to the present exemplary embodiment handles image data and sound data, the image data and the sound data typically have different sampling rates. The sound data often has a higher sampling rate. In such a case, the processing on the sound data in steps S108 and S109 and the processing on the sound data in steps S106 and S107 can be looped until the next piece of image data is sampled. Alternatively, the sound data and the image data can be processed on different threads. In such a case, the sound combination unit 18 running on a different thread from that of the processing related to the image data obtains the MR flag. If the MR flag is set to 1, the sound combination unit 18 does not reduce the external sound. If the MR flag is set to 0, the sound combination unit 18 reduces the external sound.

In the foregoing first exemplary embodiment, the example has been descried where whether the MR flag is set to 1 or 0 is determined based on the mask image as the mixing information, and whether to adjust the external sound is switched based on the value of the MR flag.

A second exemplary embodiment deals with an example where the mixing information includes spatial information. In the present exemplary embodiment, the spatial information is distance information about a distance from the viewer. The distance information according to the present exemplary embodiment is information indicating the distance from the viewer to a sound source in the real space. The viewer may wish to hear external sound from a sound source nearby in the real space. Examples of such a situation include a case where the user is doing work at hand while viewing a VR image. In such a case, external sound from a sound source near the viewer is often desirably audible.

To handle such a situation, the information processing apparatus 100 according to the present exemplary embodiment includes distance information as spatial information into mixing information, and makes a sound adjustment based on the distance information. The information processing apparatus 100 according to the present exemplary embodiment has a similar hardware configuration and functional configuration to those in the first exemplary embodiment. In the present exemplary embodiment, similar functional components and processing steps to those in the first exemplary embodiment are denoted by the same reference numerals, and a description thereof will be omitted. Differences from the first exemplary embodiment will mainly be described.

While the information processing apparatus 100 according to the present exemplary embodiment has a similar functional configuration to that of FIG. 3 described above, the mixing information obtaining unit 12 according to the present exemplary embodiment outputs mixing information including spatial information to the output image obtaining unit 14 and the mixing ratio calculation unit 15.

<Information Processing>

Figure 5:
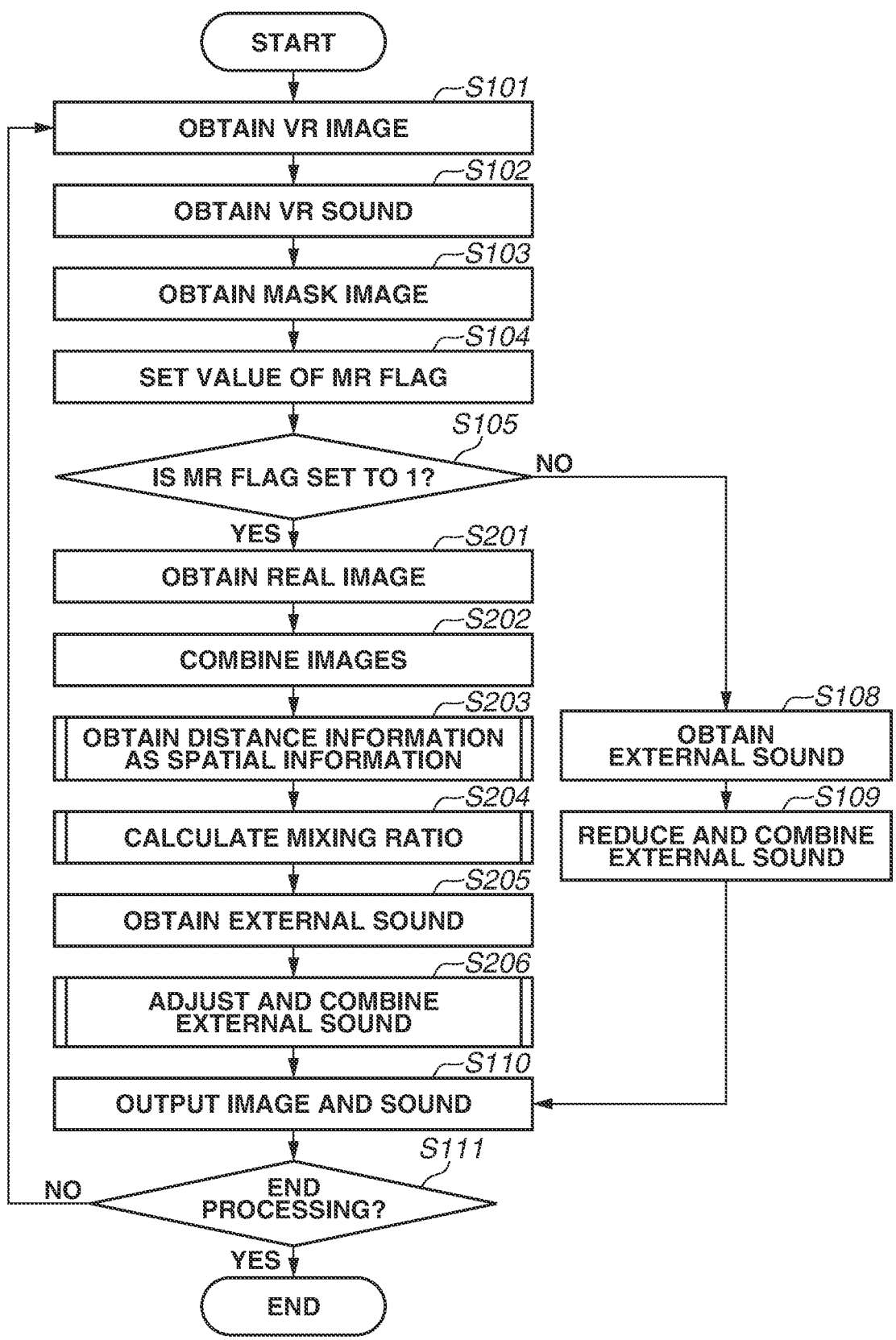
FIG. 5 is a flowchart of information processing according to a second exemplary embodiment.

FIG. 5 is a flowchart illustrating a procedure for information processing performed by the information processing apparatus 100 according to the present exemplary embodiment. In the present exemplary embodiment, if the MR flag is determined to be 0 (NO in step S105), the processing proceeds to step S108. If the MR flag is determined to be 1 (YES in step S105), the processing proceeds to step S201. After the processing of steps S201 to S206, the processing proceeds to step S110.

In the present exemplary embodiment, in step S201, the real image obtaining unit 13 obtains, as a real image, an image of the real space captured by the camera.

In step S202, the output image obtaining unit 14 generates a combined image by combining the real image obtained by the real image obtaining unit 13 with the VR image obtained by the VR image obtaining unit 11. The processing for combining the real image and the VR image is similar to the image combination processing in step S107 described above.

In step S203, the mixing information obtaining unit 12 obtains distance information as spatial information.

Figure 6:
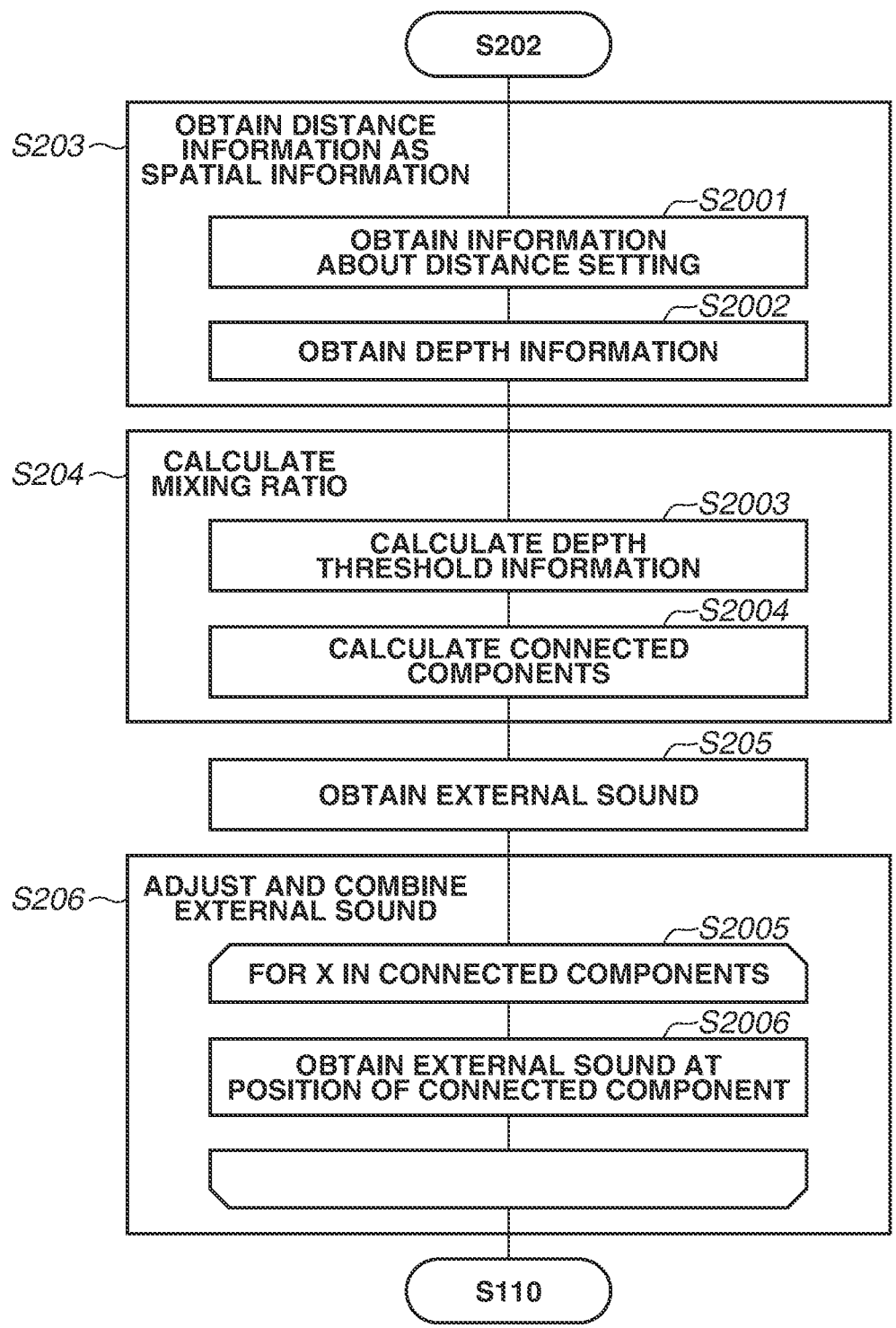
FIG. 6 is a detailed flowchart illustrating processing from acquisition of spatial information to combination of external sound.

FIG. 6 is a flowchart illustrating details of the processing of step S203 in obtaining the distance information, the processing of step S204 at the subsequent stage, and the processing of step S206 at the further subsequent stage.

Detailed processing of step S203 will be described with reference to FIG. 6.

In step S2001, the mixing information obtaining unit 12 obtains information about a distance setting. The distance setting refers to, for example, information set by the viewer or a system administrator as a desired distance for hearing external sound. The present exemplary embodiment deals with an example where the viewer makes the distance setting. In such a case, for example, the information processing apparatus 100 displays a user interface (UI) screen on the HMD 1, and the mixing information obtaining unit 12 obtains a distance threshold Dth optionally set by the viewer via the input device 107 as the information about the distance setting. The distance threshold Dth set by the viewer as the information about the distance setting corresponds to the distance from the HMD 1 to an object in the real world. In making the distance setting, the UI screen displays objects located at distances less than the distance threshold Dth from the HMD 1 and does not display objects located at distances more than or equal to the distance threshold Dth. While viewing the UI screen, the viewer sets the desired distance for hearing external sound. The method for setting the distance and the definition of the distance are not limited to those of the UI-based setting. For example, if an object in the real space, such as an object on a desk, is a sound source, the distance from the HMD 1 to the desk can be measured by a conventional technique such as stereo matching, and the setting can be made based on the measured distance. The definition of the distance may not necessarily be based on the distance from the HMD 1. For example, the distance can be defined as the distance from the center of gravity of the viewer.

In step S2002, the mixing information obtaining unit 12 obtains depth information from the real image. The depth information refers to information indicating the depth to an object in the real image on a pixel-by-pixel basis. The depth information can be determined using a conventional technique such as stereo matching. The mixing information obtaining unit 12 can determine the depth using a range finder such as light detection and ranging or laser imaging detection and ranging (Lidar).

In step S204, the mixing ratio calculation unit 15 calculates a mixing ratio. The mixing ratio according to the present exemplary embodiment is different from that in the first exemplary embodiment described above.

Detailed processing of step S204 will be described with reference to FIG. 6.

In step S2003, the mixing ratio calculation unit 15 calculates depth threshold information. The depth threshold information refers to information that stores, on a pixel-by-pixel basis, information indicating whether the depth to an object corresponding to each pixel of the real image is less than the distance threshold Dth or greater than or equal to the distance threshold Dth.

If the depth of each pixel of an object in the real image obtained in step S2002 is less than the distance threshold Dth, the mixing ratio calculation unit 15 records a value of 1 at the corresponding pixel position of the depth threshold information. If the depth is greater than or equal to the distance threshold Dth, the mixing ratio calculation unit 15 records a value of 0 at the pixel position.

In step S2004, the mixing ratio calculation unit 15 calculates connected components of the depth threshold information. The mixing ratio calculation unit 15 assumes positions where pixels having a value of 1 are adjacent to each other in the depth threshold information as a connected component, and stores such connected components in a list. As will be described below, the list of connected components provides mixing ratios so that the external sound from the areas indicated by the connected components is combined and the external sound from the other areas is not combined (is reduced).

In step S205, the external sound obtaining unit 17 obtains external sound. The processing then proceeds to step S206. The external sound obtaining processing by the external sound obtaining unit 17 is similar to that of step S108 described above.

In step S206, the sound combination unit 18 combines the external sound. The sound combination processing in step S206 is different from that of the foregoing first exemplary embodiment.

Detailed processing of step S206 will be described with reference to FIG. 6.

In step S2005, the sound combination unit 18 refers to the list calculated in step S2004 and determines whether there is a connected component for which external sound has not been combined. If there is any connected component for which external sound has not been combined, the sound combination unit 18 selects one of such connected components in the list and performs the processing of the subsequent step S2006 on the selected connected component. In other words, the processing of step S206 is loop processing. If there is no connected component for which external sound has not been combined in the list, the processing proceeds to step S110.

In step S2006, the sound combination unit 18 obtains, from the external sound obtaining unit 17, the external sound at the position of the selected connected component. An example of a method for obtaining the external sound at the position of the connected component is to use a directional microphone as the microphone. The external sound obtaining unit 17 obtains the external sound from the directional microphone. As another example, a plurality of microphones can be installed, and a sound generation position can be estimated using a conventional sound generation source estimation method that estimates the sound generation position (the sound source) based on differences in phase between the microphones. If sound is found at the position indicated by the connected component, the external sound obtaining unit 17 obtains the sound at the position.

In the present exemplary embodiment, in combining the external sound in step S206, the external sound may not necessarily be combined at its unadjusted intensity. For example, in step S204, the intensity can be adjusted using a gain based on the distance instead of the depth threshold information, and the sound can be combined at the intensity adjusted based on the gain. In such a case, the connected components can be determined by calculating those of pixels having non-zero values.

In the present exemplary embodiment, in an application where the VR image alone is displayed on the HMD 1, the external sound is substantially cut off by noise cancelling as with the foregoing first exemplary embodiment. Alternatively, for example, the viewer's ears can be physically covered to prevent the viewer from hearing the external sound.

In such a case, the external sound obtaining processing of step S108 and the sound adjustment and external sound combination processing of step S109 in the flowchart of FIG. 5 can be eliminated.

As described above, the information processing apparatus 100 according to the present exemplary embodiment can include distance information serving as spatial information into the mixing information, and make the sound adjustment based on the distance information. More specifically, in the present exemplary embodiment, the mixing ratio calculation unit 15 calculates mixing ratios so that external sound from sound sources at distances greater than or equal to the distance threshold Dth in the real space is reduced and external sound from sound sources at distances less than the distance threshold Dth is not reduced. This enables the viewer to hear a sound nearby in the real space. Similarly to the foregoing first exemplary embodiment, the present exemplary embodiment can save the viewer the trouble of adjusting the external sound by himself/herself.

In the foregoing second exemplary embodiment, the example has been described where the mixing information includes distance information serving as spatial information.

A third exemplary embodiment deals with an example where the mixing information includes transparency information about a VR image. For example, the viewer may wish to temporarily check information about the surroundings even in an application where a VR image is displayed. For example, the viewer who is moving may make contact with another person who is approaching the viewer. In such a case, it is desirable for the viewer to be able to check his/her surroundings. The information processing apparatus 100 according to the present exemplary embodiment thus includes transparency information about the VR image into the mixing information, and adjusts the external sound based on the transparency information.

The information processing apparatus 100 according to the present exemplary embodiment has a similar hardware configuration and functional configuration to those in the foregoing first exemplary embodiment. In the present exemplary embodiment, functional components and processing steps similar to those in the first and second exemplary embodiments are denoted by the same reference numerals, and a description thereof will be omitted. Differences will mainly be described.

<Functional Configuration of Information Processing Apparatus>

The functional configuration of the information processing apparatus 100 according to the present exemplary embodiment is similar to that of FIG. 3 described above. Also in the present exemplary embodiment, the mixing information obtaining unit 12 outputs the mixing information to the output image obtaining unit 14 and the mixing ratio calculation unit 15. In the present exemplary embodiment, the mixing information includes the transparency information about the VR image.

<Information Processing>

Figure 7:
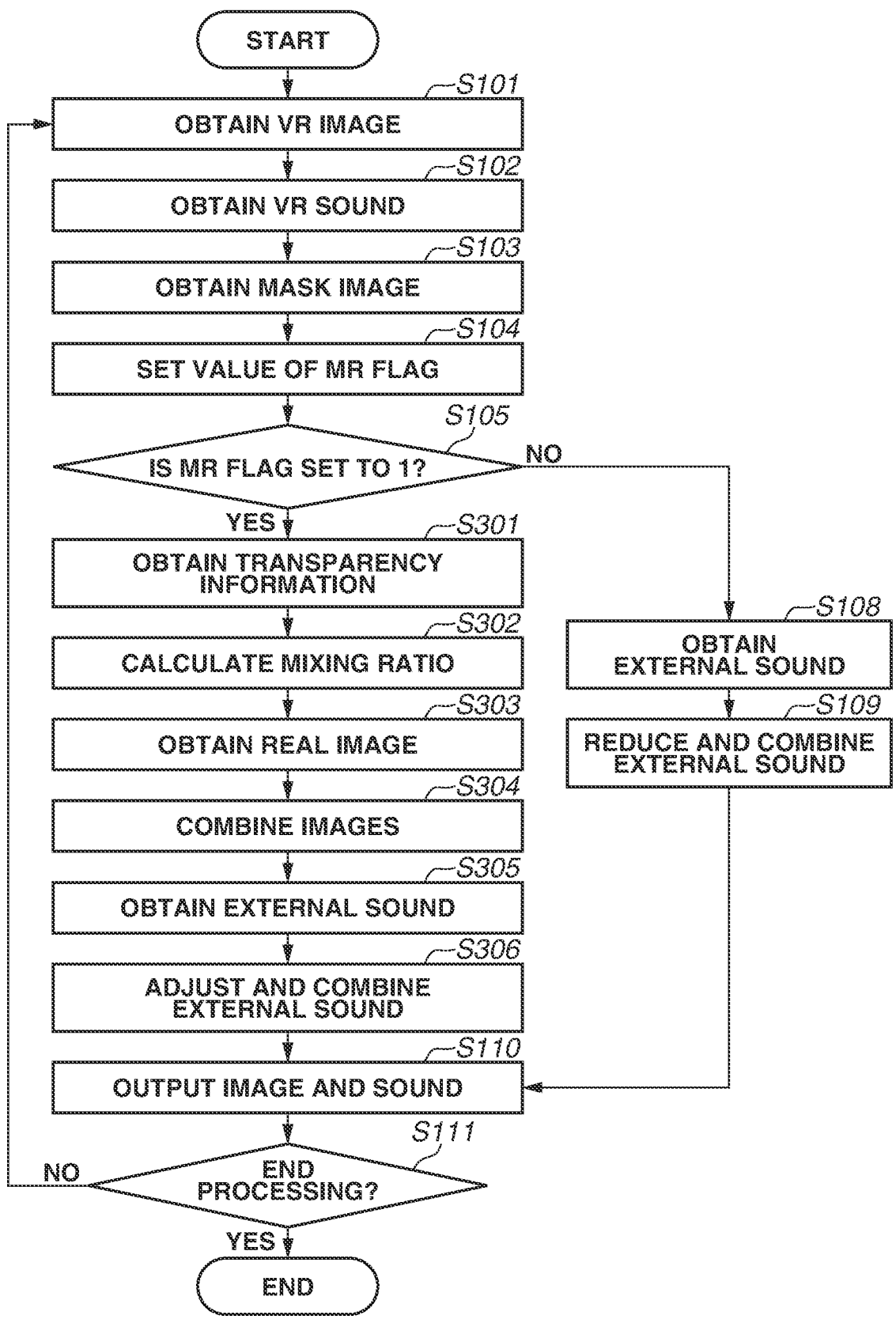
FIG. 7 is a flowchart of information processing according to a third exemplary embodiment.

FIG. 7 is a flowchart illustrating a procedure for information processing performed by the information processing apparatus 100 according to the present exemplary embodiment. If the MR flag is determined to be 1 (YES in step S105), the processing proceeds to step S301. If the MR flag is determined to 0 (NO in step S105), the processing proceeds to step S108. After the processing of steps S301 to S306, the processing proceeds to step S110.

In step S301, the mixing information obtaining unit 12 obtains transparency information included in the mixing information. The transparency information refers to, for example, a transparency value set by the viewer or the system administrator. In the present exemplary embodiment, the mixing information obtaining unit 12 obtains, for example, a transparency value set by the viewer via the input device 107 as the transparency information. In the present exemplary embodiment, transparency Tv is used as the transparency information. The transparency Tv has a value of 0 to 1.

In step S302, the mixing ratio calculation unit 15 calculates a mixing ratio based on the transparency information (the transparency Tv). In the present exemplary embodiment, the transparency Tv is simply used as the mixing ratio. The transparency Tv may not necessarily be used as the mixing ratio. For example, a power of the transparency Tv can be used as the mixing ratio. In such a case, the information processing apparatus 100 performs combination to be described below by substituting the power of the transparency Tv for the transparency Tv.

In step S303, the real image obtaining unit 13 obtains, as a real image, a captured image of the real space around the viewer.

In step S304, the output image obtaining unit 14 combines the VR image obtained by the VR image obtaining unit 11 and the real image obtained by the real image obtaining unit 13 based on the mixing ratio calculated in step S302. At this time, the output image obtaining unit 14 multiplies the RGB values of each pixel of the real image by the transparency Tv. The output image obtaining unit 14 also multiplies the RGB values of each pixel of the VR image by (1−Tv). The output image obtaining unit 14 then adds the real image and the VR image after the multiplication for combination, whereby a combined image is generated.

In step S305, the external sound obtaining unit 17 obtains external sound.

In step S306, the sound combination unit 18 combines the external sound obtained by the external sound obtaining unit 17 with the VR sound obtained by the VR sound obtaining unit 16 to generate combined sound. At this time, the sound combination unit 18 makes a sound adjustment to make the intensity of the external sound the transparency Tv times, and combines the adjusted external sound with the VR sound. In adjusting the intensity of the external sound, the sound combination unit 18 may not necessarily make the external sound Tv times and can perform multiplication by another predetermined constant. Alternatively, for example, the sound combination unit 18 can determine the maximum value for the sound adjustment based on the transparency Tv, and apply a gain so that the maximum sound level of the external sound matches the maximum value.

As described above, the information processing apparatus 100 according to the present exemplary embodiment can adjust the external sound based on the transparency information included in the mixing information. More specifically, in the present exemplary embodiment, the mixing ratio calculation unit 15 obtains the mixing ratio based on the transparency information. The present exemplary embodiment thus enables the viewer to check the external sound in the surroundings. Moreover, since the external sound is adjusted based on the transparency Tv of the VR image, the present exemplary embodiment can save the viewer the trouble of adjusting the external sound.

In the present exemplary embodiment, the example where the transparency information is set by the viewer or the system administrator has been described. However, this is not restrictive. For example, the mixing information obtaining unit 12 can obtain the amount of movement of the viewer who is moving, i.e., the amount of movement of the HMD 1, and automatically set the transparency Tv based on the obtained amount of movement. At this time, the amount of movement of the viewer who is moving (the amount of movement of the HMD 1) can be determined, for example, from the output of the acceleration sensor. In such a case, the mixing information obtaining unit 12 obtains transparency information where the transparency Tv is higher with an increased amount of movement of the HMD 1. The mixing ratio calculation unit 15 then calculates the mixing ratio so that the amount of reduction in the external sound decreases as the transparency Tv in the transparency information increases, or equivalently, the external sound becomes louder as the transparency Tv in the transparency information increases. Alternatively, the mixing information obtaining unit 12 can obtain transparency information where the transparency Tv is lower with a decreased amount of movement of the HMD 1. In such a case, the mixing ratio calculation unit 15 calculates the mixing ratio so that the amount of reduction in the external sound increases as the transparency Tv in the transparency information decreases, or equivalently, the external sound becomes smaller as the transparency Tv in the transparency information decreases.

In the present exemplary embodiment, for example, a specific area can be determined in the VR space or the real space in advance, and the mixing information obtaining unit 12 can obtain predetermined transparency information if the viewer goes out of the specific area. Take, for example, a case where the viewer is experiencing a VR game using the HMD 1. A system that predetermines the area where the viewer plays the VR image in the real world, and suspends the VR game if the viewer goes out of the area has been put to practical use. If the viewer goes out of the area set in the real world, the real image is displayed through the VR game image, for example, whereby the viewer can check both the situation in the real world and the situation in the VR world. While the viewer is checking the surroundings, the external sound is desirably audible at the same time. To handle such a case, the mixing information obtaining unit 12 can obtain transparency information that makes the VR image transparent when the viewer of the HMD 1 goes out of the specific area in the real world, and obtain transparency information that does not make the VR image transparent while the viewer is inside the specific area. In such a case, if the transparency information that does not make the VR transparent is obtained, the mixing ratio calculation unit 15 calculates the mixing ratio so as to reduce the external sound.

In the present exemplary embodiment, the example has been described where the transparency Tv of the VR image is set for the purpose of combination with the real image. As another example, the transparency of the real image can be set for the purpose of combination with the VR image.

The transparency Tv may not necessarily have a value of 0 to 1. For example, the transparency Tv can have a value of 0 to 100, and after the processing of step S302, the transparency Tv can be divided by 100 for scaling.

The transparency information may not necessarily have a numerical value indicating the transparency Tv of the entire VR image. For example, the transparency information can be a transparent image having the same resolution as that of the real image. In this case, for example, each pixel value of the transparent image indicates transparency. A statistic of the transparent image can be used as the transparency Tv. Examples of the statistic include an average, a median, a maximum value, and a minimum value of the transparent image.

In the present exemplary embodiment, similarly to the foregoing first exemplary embodiment, the external sound is substantially cut off by noise cancelling if the MR flag is set to 0 and the VR image alone is displayed without the real image. Alternatively, as described in the second exemplary embodiment, the viewer's ears can be physically covered to prevent the viewer from hearing the external sound, for example. Also in the present exemplary embodiment, if the viewer uses, for example, a headphone device with which the viewer can hear the external sound in the surrounding real space while the noise cancelling processing for reducing the external sound is disabled, the external sound obtaining processing of step S106 and the external sound combination processing of step S107 can be eliminated.

In the foregoing second exemplary embodiment, the distance information is used as the spatial information. A fourth exemplary embodiment deals with an example where direction information is used as the spatial information.

The viewer may wish to hear external sound in a specific direction while checking the situation of the real space in that direction. For example, displaying the real image in the direction where a subject to be watched over, such as a baby or a pet, is present while displaying the VR image in the other directions enables the viewer to check the condition of the subject to be watched over in the real space. At this time, it may be more desirable for the viewer to be able to hear the baby's cry as well as view the real image of the baby, for example. The present exemplary embodiment thus uses, as the spatial information, direction information about the direction in which the real image is captured.

The information processing apparatus 100 according to the present exemplary embodiment has a similar hardware configuration and functional configuration to those in the foregoing first exemplary embodiment. A description thereof will thus be omitted. While the functional configuration of the information processing apparatus 100 according to the present exemplary embodiment is substantially the same as that of FIG. 3 described above, the mixing information obtaining unit 12 according to the present exemplary embodiment obtains mixing information including direction information, and outputs the information to the output image obtaining unit 14 and the mixing ratio calculation unit 15. In the present exemplary embodiment, the mixing information thus includes the direction information. In the following description of the present exemplary embodiment, functional components and processing steps similar to those in the foregoing exemplary embodiments are denoted by the same reference numerals, and a description thereof will be omitted. Differences will mainly be described.

<Information Processing>

Figure 8:
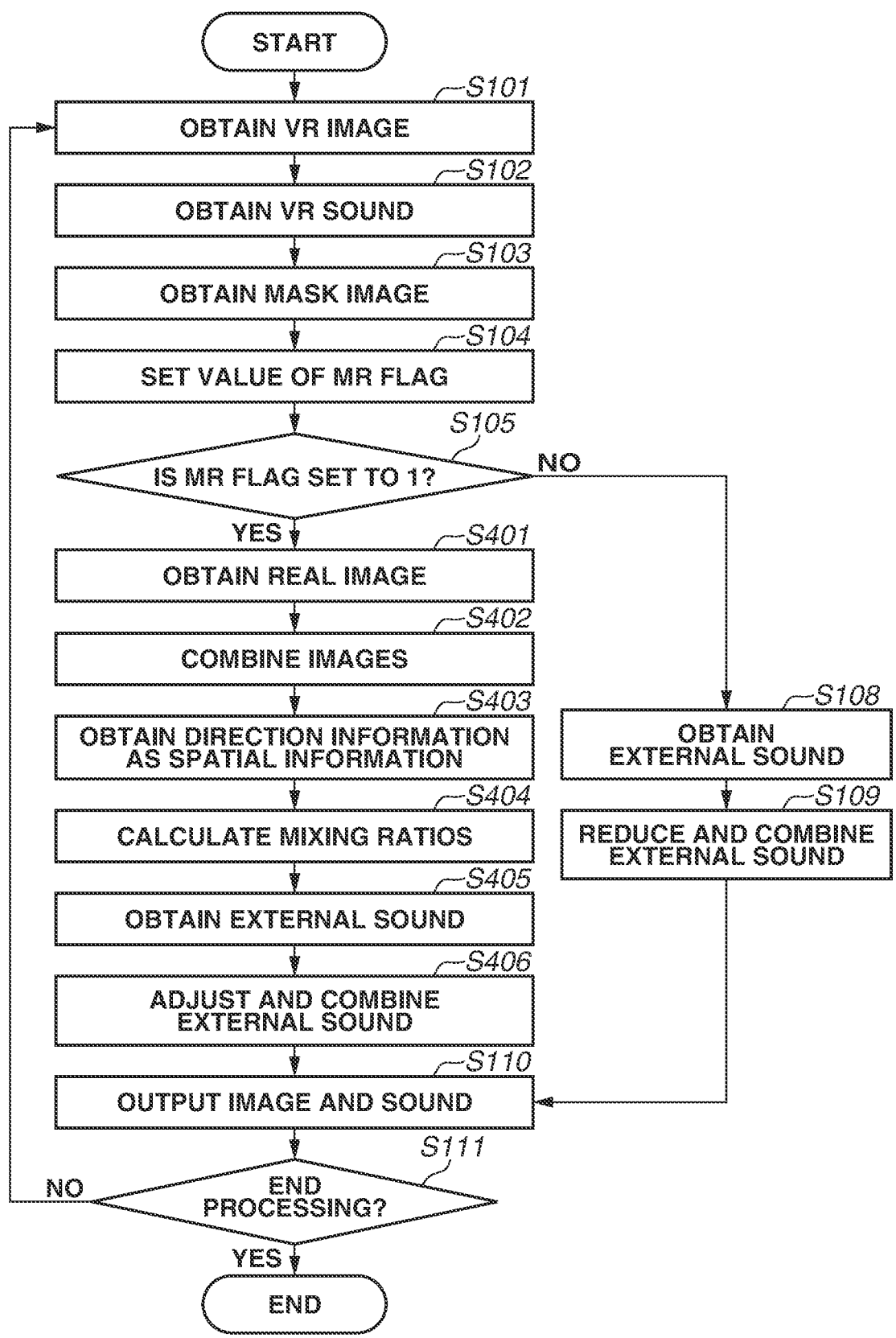
FIG. 8 is a flowchart of information processing according to a fourth exemplary embodiment.

FIG. 8 is a flowchart illustrating a procedure for information processing performed by the information processing apparatus 100 according to the present exemplary embodiment. In the present exemplary embodiment, if the MR flag is determined to be 0 (NO in step S105), the processing proceeds to step S108. If the MR flag is determined to be 1 (YES in step S105), the processing proceeds to step S401. After the processing of steps S401 to S406, the processing proceeds to step S110.

In step S401, the real image obtaining unit 13 obtains, as a real image, a captured image of the real space around the viewer.

In step S402, the output image obtaining unit 14 combines the VR image obtained by the VR image obtaining unit 11 and the real image obtained by the real image obtaining unit 13.

In step S403, the mixing information obtaining unit 12 obtains direction information as spatial information included in the mixing information. For example, the mixing information obtaining unit 12 obtains, as the direction information, the direction (left or right) in which the real image occupies a large proportion when the HMD screen is divided into left and right halves. At this time, for each of the left and right halves of the HMD screen, the mixing information obtaining unit 12 determines the numbers of pixels of the VR image and the real image based on the mask information obtained in step S103. If the number of pixels of the real image is greater in a left or right direction, the mixing information obtaining unit 12 determines that that direction is where the real image occupies a large proportion. The HMD screen can be divided into left and right sections at any position instead of the center. The HMD screen can also be divided in any shape and in any number instead of being divided into left and right halves. If, for example, a plurality of directional microphones for collecting external sound in the real space is installed in respective different directions, the HMD screen can be divided based on the directions of the directional microphones. Further, the direction can be obtained based on the viewer's input. For example, if an input to install a virtual display in the left half is accepted, the direction where the real image occupies a large proportion is the right direction.

In step S404, the mixing ratio calculation unit 15 calculates mixing ratios. For example, the mixing ratio calculation unit 15 calculates the mixing ratios so that the external sound in the direction where the proportion of the real image is determined to be large in step S403 is combined at its unadjusted intensity, and the external sound in the directions other than the direction where the proportion of the real image is determined to be large is not combined (is reduced).

In step S405, the external sound obtaining unit 17 obtains external sound. If a plurality of directional microphones is installed in different directions as described above, the external sound obtaining unit 17 obtains the external sound collected by each of the directional microphones.

In step S406, the sound combination unit 18 combines the external sound based on the mixing ratios calculated in step S404. For example, the sound combination unit 18 combines the external sound obtained from the directional microphone installed in the direction where the external sound is to be combined at the unadjusted intensity, with the VR sound.

As described above, the information processing apparatus 100 according to the present exemplary embodiment can adjust the external sound based on the direction information as the spatial information. More specifically, in the present exemplary embodiment, the mixing ratio calculation unit 15 calculates a mixing ratio so as to reduce the external sound from sound sources in directions other than the direction based on the direction information in the real space, and calculates a mixing ratio so as not to reduce the external sound from the sound source in the direction based on the direction information. This enables the viewer to hear the sound in a specific direction, and can save the viewer the trouble of adjusting the external sound.

The mixing ratios calculated in step S404 may not necessarily be such that the external sound is combined at the unadjusted intensity. For example, an image indicating mixing ratios with the same resolution as that of the real image can be prepared, and the mixing ratios can be calculated so as to provide gains in the intensity of the external sound corresponding to the respective pixel values. In such a case, the mixing information obtaining unit 12 obtains the direction information indicating the direction where the proportion of an image based on the real image is large, from the combined image obtained by combining the real image and the VR image based on the mixing information. In this case, the mixing ratio calculation unit 15 calculates a normal distribution centered at the direction based on the proportion of the image based on the real image, i.e., a normal distribution centered at the center of the area in the direction where the proportion of the real image is determined to be large. The mixing ratio calculation unit 15 then uses the values of the normal distribution corresponding to the respective pixel positions of the combined image, as gains for adjusting the intensity of the external sound. In other words, the mixing ratio calculation unit 15 obtains mixing ratios so as to adjust the gains of the external sound, using the values of the normal distribution as the gains. In step S406, the sound combination unit 18 multiplies the external sound by the gains corresponding to the respective directions, and combines the resulting sound with the VR sound.

If, for example, an object that makes a sound moves between a direction where the external sound is not reduced and a direction where the external sound is reduced, the sound made by the moving object changes greatly at the border. The same applies to a case where the viewer is moving. To prevent such a sudden change in the loudness of the external sound, the external sound can be adjusted temporally gradually. For example, suppose that the HMD screen is divided into left and right halves, and an object as a sound source has moved from the right half to the left half while the external sound in the left half is reduced. In this case, the movement of the object is detected by a conventional object detection technique, and if the movement is detected, the sound source is isolated by a conventional sound isolation technique. The sound data of the sound source is then combined so that the sound decreases gradually over a predetermined period. This is implemented by applying a gain gradually decreasing from 1 to 0 to the intensity of the isolated external sound.

In step S403, the mixing information obtaining unit 12 can recognize the area of a specific object using a conventional object recognition technique, and use the area as the direction information. In such a case, in step S404, the mixing ratio calculation unit 15 calculates a mixing ratio so as to combine the external sound from the sound source in the area.

For example, in the present exemplary embodiment, the viewer's ears can be physically covered to prevent the viewer from hearing the external sound similarly to the foregoing exemplary embodiments. Also in the present exemplary embodiment, if the viewer uses, for example, a headphone device with which the viewer can hear the external sound in the surrounding real space while the noise cancelling processing for reducing the external sound is disabled, the external sound obtaining processing of step S106 and the external sound combination processing of step S107 can be eliminated.

In the foregoing fourth exemplary embodiment, the direction information is used as the spatial information. A fifth exemplary embodiment deals with an example where area information is used as the spatial information. For example, if the proportion of the area of the VR image in the image displayed on the HMD 1 is large, the content is considered to mainly feature the VR space. In such a case, the amount of reduction of the external sound is desirably increased. By contrast, if the proportion of the area of the VR image is small, the content is considered to not mainly feature the VR space. In such a case, the external sound is desirably audible. To handle such situations, the present exemplary embodiment uses area information indicating the area occupied by the VR image.

The information processing apparatus 100 according to the present exemplary embodiment has a similar hardware configuration and functional configuration to those in the foregoing first exemplary embodiment. A description thereof will thus be omitted. While the functional configuration of the information processing apparatus 100 according to the present exemplary embodiment is substantially the same as that of FIG. 3 described above, the mixing information obtaining unit 12 according to the present exemplary embodiment obtains mixing information including area information, and outputs the information to the output image obtaining unit 14 and the mixing ratio calculation unit 15. In the present exemplary embodiment, the mixing information thus includes the area information. In the following description of the present exemplary embodiment, functional components and processing steps similar to those in the foregoing exemplary embodiments are denoted by the same reference numerals, and a description thereof will be omitted. Differences will be mainly described.

<Information Processing>

FIG. 9 is a flowchart illustrating a procedure for information processing performed by the information processing apparatus 100 according to the present exemplary embodiment. In the present exemplary embodiment, if the MR flag is determined to be 0 (NO in step S105), the processing proceeds to step S108. If the MR flag is determined to 1 (YES in step S105), the processing proceeds to step S501. After steps S501 to S506, the processing proceeds to step S110.

In step S501, the real image obtaining unit 13 obtains, as a real image, a captured image of the real space around the viewer.

In step S502, the output image obtaining unit 14 combines the VR image obtained by the VR image obtaining unit 11 and the real image obtained by the real image obtaining unit 13.

In step S503, the mixing information obtaining unit 12 obtains area information about the VR image and the real image. For example, the mixing information obtaining unit 12 counts the number of pixels having a value of 1 in the mask image obtained in step S104, and determines a ratio AR as the area information by dividing the counted number of pixels having a value of 1 by the total number of pixels.

In step S504, the mixing ratio calculation unit 15 calculates a mixing ratio. In the present exemplary embodiment, a gain of the ratio AR is applied to the intensity of the VR sound, as the mixing ratio. A gain of (1−AR) is applied to the intensity of the external sound.

In step S505, the external sound obtaining unit 17 obtains external sound.

In step S506, the sound combination unit 18 combines the external sound based on the mixing ratio calculated in step S504.

As described above, the information processing apparatus 100 according to the present exemplary embodiment can adjust the external sound based on the area information as the spatial information. More specifically, in the present exemplary embodiment, the mixing ratio calculation unit 15 calculates a mixing ratio so as to reduce the external sound if the proportion of the area of the VR image is greater than that of the real image in the combined image of the real image and the VR image to be displayed on the HMD 1. If the proportion of the area of the real image is greater than that of the VR image, the mixing ratio calculation unit 15 calculates a mixing ratio so as not to reduce the external sound. This enables the viewer to hear sound based on the content displayed on the HMD 1, and can also save the viewer the trouble of adjusting the external sound.

The area information can be calculated based on the angles of view corresponding to the real image and the VR image. For example, if the real image and the VR image have fixed angles of view, the ratio therebetween is used as the area information.

As described above, the information processing apparatus 100 according to the present exemplary embodiment can adjust the external sound based on the area information as the spatial information. The external sound can thus be adjusted based on the area of the VR image. As a result, the viewer can save the trouble of making sound adjustments.

For example, in the present exemplary embodiment, the viewer's ears can be physically covered to prevent the viewer from hearing the external sound similarly to the foregoing exemplary embodiments. Also in the present exemplary embodiment, if the viewer uses, for example, a headphone device with which the viewer can hear the external sound in the surrounding real space while the noise cancelling processing for reducing the external sound is disabled, the external sound obtaining processing of step S106 and the external sound combination processing of step S107 can be eliminated.

In the foregoing first to fifth exemplary embodiments, the mask image, the transparency information, or the information about application programs is used as the mixing information. Moreover, the distance information, the direction information, and the area information are individually used as the spatial information. Alternatively, two or more of the pieces of information can be combined as appropriate. In other words, the image combination, the external sound combination, and the sound adjustment can be performed by combining two or more of the pieces of information as appropriate. In any combination thereof, an exemplary embodiment of the present disclosure enables the viewer experiencing VR or MR to hear external sound in a case where the external sound is desirably audible.

An exemplary embodiment of the present disclosure can also be implemented by processing of supplying a program for implementing one or more functions according to the foregoing exemplary embodiments to a system or an apparatus via a network or a storage medium, and causing one or more processors in a computer of the system or the apparatus to read and execute the program.

An exemplary embodiment of the present disclosure can also be implemented by a circuit (e.g., an application specific integrated circuit (ASIC)) for implementing the one or more functions.

The foregoing exemplary embodiments are merely specific examples in carrying out the present disclosure, and the technical scope of the present disclosure should not be interpreted as limited thereto.

An exemplary embodiment of the present disclosure can be carried out in various forms without departing from the technical concept or essential features thereof.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-078133, filed May 11, 2022, which is hereby incorporated by reference herein in its entirety.

What is claimed is:
1. An information processing apparatus comprising:
one or more memories storing instructions; and
one or more processors executing the instructions and/or circuitry to:
obtain a real image corresponding to a real space and a virtual image, the real image being an image of the real space captured by an imaging device included in a head-mounted device;
obtain external sound in the real space and virtual sound associated with the virtual image;
adjust relative sound levels of the external sound and the virtual sound based on at least one of the real image or the virtual image; and
output a combined image to a display device included in a head-mounted device, the combined image being obtained by combining the real image and the virtual image based on mixing information, wherein the mixing information includes transparency information that determines transparency of an image based on the virtual image where the transparency is lower with a decreased amount of movement, wherein the one or more processors and/or circuitry further causes the information processing apparatus to
generate combined sound by combining the virtual sound and the external sound based on at least one of the real image or the virtual image,
adjust the relative sound levels based on the transparency information, and
perform control so that an amount of reduction of the external sound increases as the transparency determined by the transparency information decreases.

2. The information processing apparatus according to claim 1, wherein the one or more processors and/or circuitry obtains the mixing information,
wherein, in a case where the mixing information includes information indicating combination of the real image with the virtual image, the adjustment unit is configured to perform control so that the external sound is not reduced.

3. The information processing apparatus according to claim 2,
wherein the mixing information is a mask image indicating an image area corresponding to the virtual image, and
wherein the adjustment unit is configured to determine, based on the mask image, whether the mixing information includes the information indicating the combination of the real image with the virtual image.

4. The information processing apparatus according to claim 1, wherein, in a case where the mixing information is information indicating an application program configured to display the combined image obtained by combining the real image of the real space and the virtual image on the display device included in the head-mounted device, the adjustment unit is configured to perform control so that the external sound is not reduced.

5. The information processing apparatus according to claim 1,
wherein the mixing information includes distance information about a distance from the head-mounted device to an object in the real space, and
wherein the one or more processors and/or circuitry performs control to reduce external sound from a sound source located at a distance greater than or equal to a distance threshold indicated by the distance information in the real space.

6. The information processing apparatus according to claim 5, wherein the one or more processors and/or circuitry performs control to adjust a gain of the external sound based on the distance information.

7. The information processing apparatus according to claim 1, wherein the mixing information indicates a proportion of an image based on the real image in the combined image.

8. The information processing apparatus according to claim 1,
wherein the mixing information includes area information about an image based on the real image and an image based on the virtual image, and
wherein, in a case where a proportion of an area of the image based on the real image is greater than a proportion of an area of the image based on the virtual image in the combined image to be displayed on the display device included in the head-mounted device, wherein the one or more processors and/or circuitry performs control so that the external sound is not reduced.

9. The information processing apparatus according to claim 1, wherein the one or more processors and/or circuitry adjusts the external sound so that the external sound changes temporally over a predefined period.

10. The information processing apparatus according to claim 1, wherein, in a case where the head-mounted device is outside a specified area of the real space, the one or more processors and/or circuitry performs control to reduce the external sound.

11. An information processing apparatus comprising:
one or more memories storing instructions; and
one or more processors executing the instructions and/or circuitry to:
obtain a real image corresponding to a real space and a virtual image, the real image being an image of the real space captured by an imaging device included in the head-mounted device;
obtain external sound in the real space and virtual sound associated with the virtual image;
adjust relative sound levels of the external sound and the virtual sound based on at least one of the real image or the virtual image; and,
output a combined image to a display device included in a head-mounted device, the combined image being obtained by combining the real image and the virtual image based on mixing information,
wherein the at least one of the one or more circuits or the execution of the instructions by the one or more processors further causes the information processing apparatus to generate combined sound by combining the virtual sound and the external sound based on at least one of the real image or the virtual image,
wherein the mixing information includes transparency information that determines transparency of an image based on the virtual image,
and the mixing information includes the transparency information where the transparency is higher with an increased amount of movement of the head-mounted device in the real space,
wherein the one or more processors and/or circuitry further causes the information processing apparatus to adjust the relative sound levels based on the transparency information, and
to perform control so that the external sound increases as the transparency determined by the transparency information increases.

12. An information processing method performed by an information processing apparatus, the information processing method comprising:
obtaining a real image corresponding to a real space and a virtual image, wherein the real image is real space captured by an imaging device included in a head-mounted device;
obtaining external sound in the real space and virtual sound associated with the virtual image;
adjusting relative sound levels of the external sound and the virtual sound based on at least one of the real image or the virtual image;
outputting a combined image to a display device included in a head-mounted device, the combined image being obtained by combining the real image and the virtual image based on mixing information, wherein the mixing information includes transparency information that determines transparency of an image based on the virtual image where the transparency is lower with a decreased amount of movement;

generating combined sound by combining the virtual sound and the external sound based on at least one of the real image or the virtual image, adjusting the relative sound levels based on the transparency information, and performing control so that an amount of reduction of the external sound increases as the transparency determined by the transparency information decreases.

13. A non-transitory computer-readable storage medium storing instructions that, when executed by a computer, cause the computer to perform an information processing method comprising:

obtaining a real image corresponding to a real space and a virtual image, wherein the real image is real space captured by an imaging device included in a head-mounted device;

obtaining external sound in the real space and virtual sound associated with the virtual image;

adjusting relative sound levels of the external sound and the virtual sound based on at least one of the real image or the virtual image;

outputting a combined image to a display device included in a head-mounted device, the combined image being obtained by combining the real image and the virtual image based on mixing information, wherein the mixing information includes transparency information that determines transparency of an image based on the virtual image where the transparency is lower with a decreased amount of movement;

generating combined sound by combining the virtual sound and the external sound based on at least one of the real image or the virtual image, adjusting the relative sound levels based on the transparency information, and performing control so that an amount of reduction of the external sound increases as the transparency determined by the transparency information decreases.

* * * * *